United States Patent [19]

Asrar

[11] Patent Number: 4,816,521
[45] Date of Patent: Mar. 28, 1989

[54] CYCLOPENTADIENYLENE VINYLENE POLYMERS

[75] Inventor: Jawed Asrar, Wilbraham, Mass.
[73] Assignee: Monsanto Company, St. Louis, Mo.
[21] Appl. No.: 54,633
[22] Filed: May 27, 1987
[51] Int. Cl.$^4$ ............................ C08F 32/04; C08F 8/00
[52] U.S. Cl. ............................ 525/327.2; 525/329.5; 525/326.1; 525/366; 526/280; 526/281; 526/269; 428/409; 428/411.1; 264/331.17
[58] Field of Search .............................. 526/269, 281; 525/327.3, 328.6, 329.5, 366, 327.2; 428/523, 409, 411.1; 264/331.17

[56] References Cited

U.S. PATENT DOCUMENTS 3,330,815  7/1967  McKeon et al. ................... 260/93.1
3,959,234  5/1976  Kurosawa et al. ................. 260/78
4,022,954  5/1977  Kurosawa et al. ............. 525/366 X
4,316,978  2/1982  Kennedy et al. ................ 526/348.7
4,412,044  10/1983  Takahashi et al. ............ 525/366 X

FOREIGN PATENT DOCUMENTS 3224159  12/1983  Fed. Rep. of Germany ... 525/327.2

Primary Examiner—Edward J. Smith, Jr.
Assistant Examiner—F. M. Teskin
Attorney, Agent, or Firm—Thomas E. Kelley; William J. Farrington

[57] ABSTRACT

Polycyclopentadienylene vinylene exhibiting solvent resistance, e.g. to chlorinated solvents such as chloroform and methylene chloride and to amine solvents such as dimethylformamide, is prepared by removal of acid groups from precursor polymer having norbornene dioxo derivatives.

4 Claims, No Drawings

CYCLOPENTADIENYLENE VINYLENE POLYMERS

BACKGROUND OF THE INVENTION

Disclosed herein are conjugated polymers, e.g. polymers of cyclopentadienylene vinylene together with methods of making and using such polymers.

Cyclopentadiene units have been incorporated into polymers having saturated hydrocarbon chains. For instance, Kennedy et al. in U.S. Pat. No. 4,316,978 disclose polymers having cyclopentadiene groups and McKeon et al. in U.S. Pat. No. 3,330,815 (e.g. Examples 15 and 16) disclose addition polymerization of dicyclopentadiene.

SUMMARY OF THE INVENTION

I have discovered novel polymers having cyclopentadiene incorporated directly into an unsaturated hydrocarbon polymer chain as units of cyclopentadienylene vinylene. As used herein the term "cyclopentadienylene vinylene" refers to polymers having units of the structural formula

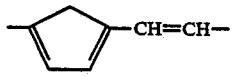

Accordingly, this invention relates to polymers comprising cyclopentadienylene vinylene and methods of making and using such polymers.

DETAILED DESCRIPTION OF PREFERRED EMBODIMENTS

Polymers provided by this invention which comprise units of cyclopentadieneylene vinylene exhibit I.R. absorption at about 1640 cm$^{-1}$, a characteristic of conjugated double bonds.

Polymers comprising cyclopentadienylene vinylene are substantially resistant to solvents for polymers, including chlorinated solvents such as methylene chloride, chloroform and the like and amide solvents such as dimethylformamide. This solvent resistance is advantageous in providing articles which comprise bulk precursor polymer and a surface layer polymer comprising cyclopentadienylene vinylene. Solvent resistance inhibits swelling and penetration of agents to the bulk polymer.

The precursor polymers of this invention are prepared from monomer units of norbornene dioxo derivatives, e.g. norbornene dioxocarbonyl and/or diesters of norbornene diol; such monomer units are of the structural formula

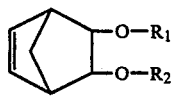

where $R_1$ and $R_2$ are independently hydrogen or an acyl, alkyl or aryl group or together are a carbonyl, methylene or substituted methylene group.

Such norbornene dioxo derivatives can be formed by metathesis ring-opening polymerization into precursor polymers comprising dioxo cyclopentane vinylene units of the structural formula

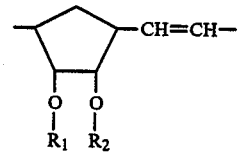

As used herein the term "norbornene dioxocarbonyl" refers to the Diels-Alder adduct of cyclopentadiene and vinylene carbonate which is identified as a substantially endo stereoisomer. As used herein the term "endo" refers to the stereoisomer form of a monomer such as norbornene dioxocarbonyl in which the oxygen atoms and the double bond are both on the same side of the surface of the saturated five-membered ring of the monomer unit. Conversely, the term "exo" refers to the stereoisomeric form of such monomer units in which the oxygen atoms and the double bond are on opposite sides of the surface of the saturated five-membered ring of the monomer unit.

As stated above $R_1$ and $R_2$ are independently hydrogen or a hydrocarbon group such as acyl, alkyl, aryl, alkaryl, or arylalkyl group or jointly are a bivalent hydrocarbon group. In some cases useful precursor polymers will be provided with the oxygen atoms bonded to a single carbonyl group, e.g. as in the endo stereoisomeric Diels-Alder adduct of cyclopentadiene and vinylene carbonate (a substantially endo stereoisomer). In other cases it is preferred that the precursor polymers be provided with the oxygen atoms bonded to lower acyl groups, e.g. as the acetate esters of norbornene diol.

The polymers of this invention can be prepared from precursor polymers comprising dioxo cyclopentane vinylene units by removing the oxo groups and alpha hydrogen, e.g. by removing ester groups as carboxylic acids or by removing dioxocarbonyl groups as carbonic acid. Such oxo group removal can be effected by a strong base, e.g. an alkali metal alkoxide such as sodium methoxide, or by pyrolysis.

A convenient starting material for the precursor polymers of this invention is the endo stereoisomeric Diels-Alder adduct of cyclopentadiene and vinylene carbonate (norbornene dioxocarbonyl). Precursor polymer can be prepared by metathesis ring opening polymerization to provide a polymer having monomer units of the following structure:

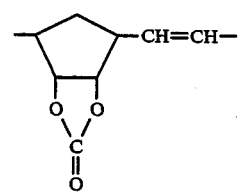

Alternatively, norbornene dioxocarbonyl can be hydrolyzed to norbornene diol, e.g. by use of a base such as potassium hydroxide. The norbornene diol is often not readily polymerizable by metathesis ring opening methods using transition metal catalysts since the hydroxyl groups are deleterious to such commonly used catalysts. Norbornene diol can, however, be esterified, e.g. to provide a diester of norbornene diol such as norbornene diacetate. Such diesters of norbornene diol are readily amenable to metathesis ring-opening polymerization to provide precursor polymers comprising monomer units of the following structure:

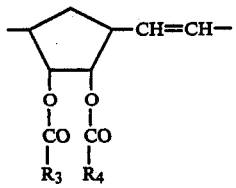

where $R_3$ and $R_4$ are independently hydrogen or an alkyl or aryl group or are jointly a bivalent alkyl, aryl, alkaryl or aralkyl group.

Metathesis ring opening polymerization is advantageously carried out at moderate temperatures, e.g. between about 25° C. and about 100° C. in a reaction medium comprising an aprotic solvent, e.g. chlorinated solvent such as chloroethane. Such catalysts are known in the art and are disclosed for instance in U.S. Pat. No. 3,959,234, incorporated herein by reference. A preferred catalyst comprises the reaction product of tungsten hexachloride and an acetal, e.g. 1,1-diethoxy ethane. Preferably, the polymerization reaction medium will also contain as an activator an aluminum alkyl such as diethyl aluminum chloride, triisobutyl aluminum or the like. Higher yields of polymers of higher inherent viscosity have been achieved with triisobutyl aluminum as the activator. The polymerization reaction medium should be kept dry and free of contaminants, e.g. water, alcohols, etc., that may interact with catalyst and/or activator to undesirably reduce catalytic activity.

Optionally, precursor polymers can be copolymers comprising any of the well-known monomers that undergo metathesis ring-opening polymerization such as norbornene, and derivatives thereof, e.g. norbornene nitrile, dicyclopentadiene and the like. It is, of course, preferred that the precursor be predominately of dioxo cyclopentane vinylene units.

The precursor polymers of this invention recovered from such polymerization solutions can be advantageously provided in a desired product form by conventional thermoplastic processing, e.g. by injection molding or by casting from solutions. Alternatively, metathesis ring-opening polymerization is advantageously carried out as a bulk polymerization process, e.g. to provide articles by reaction injection molding. Bulk polymerization is especially useful for polymerization of norbornene dioxocarbonyl and diesters of norbornene diol. Bulk polymerization is effectively carried out at a moderate temperature, e.g. between about 25° C. and about 150° C. (depending on the melting temperature of the monomer), utilizing catalysts and activators as described above.

The cyclopentadienylene vinylene polymers of this invention are advantageously prepared by removal of oxo groups and alpha hydrogen from precursor polymer which is advantageously carried out by treating formed articles comprising the precursor polymer with an alkali metal alkoxide such as sodium methoxide. In many cases, such oxo group removal to provide unsaturation in the 5 carbon ring is preferably carried out under anhydrous conditions, e.g. to avoid hydrolysis of the ester groups. If water is present it is possible to provide a hydroxylated polymer, e.g. having units of the structure

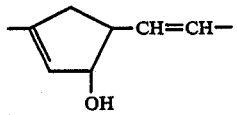

which are detected by I.R. spectroscopic analysis by an absorption band at about 3400 cm$^{-1}$, a characteristic of hydroxy groups.

The following disclosure is provided to illustrate specific embodiments and aspects of the polymers of this invention but is not intended to imply any limitation of the scope of this invention. Temperatures are reported in degrees Celsius.

EXAMPLE 1

This example serves to illustrate the preparation of norbornene dioxocarbonyl.

12.4 ml of dicyclopentadiene, 52.8 g of vinylene carbonate, and 0.4 g hydroquinone were added to 12.4 ml of toluene. The mixture was held at about 160° for about 18 hours, and the temperature was reduced to about 45° and the pressure reduced to about 5 mm to remove residual vinylene carbonate. Norbornene dioxocarbonyl was recovered at about 100% yield by raising the solution temperature to about 130°-140° and lowering the pressure to about 2 mm. Norbornene dioxocarbonyl, purified by recrystallization from carbon tetrachloride, exhibited a melting point of 114°-115°.

EXAMPLE 2

This example serves to illustrate the preparation of norbornene diol and norbornene diacetate.

8 grams of norbornene dioxocarbonyl, prepared as in Example 1, was dissolved in 120 ml of aqueous sodium hydroxide (12 g NaOH). The solution was refluxed for about 6 hours, held at room temperature for about 16 hours, neutralized with 10% HCl, and then saturated with sodium chloride. Norbornene diol extracted with ethyl ether exhibited a melting point of about 176°-177°.

A solution of 11 grams of norbornene diol (prepared as above) in 100 ml pyridine was cooled by dry ice. 45 ml of acetic anhydride was added to the cooled solution. The solution was held in the dry ice bath for about 30 minutes then allowed to sit at room temperature for about 16 hours, poured into an ice water slurry, extracted with chloroform and washed sequentially with 10% HCl, a saturated sodium bicarbonate solution, a sodium chloride solution, twice with water, then dried over sodium sulfate, and crystallized from a mixture of toluene and hexane to produce about 10 grams of norbornene diacetate.

EXAMPLE 3

This example serves to illustrate the preparation of precursor polymer by solution polymerization of norbornene dioxocarbonyl.

A metathesis polymerization catalyst was prepared by dissolving 1.7 grams of tungsten hexachloride and 1.0 grams of 1,1-diethoxy ethane in about 8.6 ml of toluene to provide a 0.5M catalyst solution based on tungsten. The catalyst and activator solutions are maintained under nitrogen atmosphere to avoid inactivation, e.g. by water and/or oxygen.

0.19 ml of activator solution comprising 2.05M diethyl aluminum chloride in heptane and about 0.08 ml of the 0.5M catalyst solution were added to a solution of 3.2 g norbornene dioxocarbonyl in 7 ml of 1,2-dichloro ethane. The solution was maintained at room temperature for about 24 hours and yielded about 0.9 g of precursor polymer having an inherent viscosity of about 0.33 dl/g (measured on a 0.5 g/dl solution in DMF at 30°).

EXAMPLE 4

This example serves to illustrate the preparation of precursor copolymers by bulk polymerization of nobornene dioxocarbonyl and norbornene nitrile.

2.9 g of norbornene dioxo carbonyl was dissolved in 5 ml of norbornene nitrile, e.g. at about 100°. 0.18 ml of 2.05M diethyl aluminum chloride in heptane and 1.1 ml of 0.05M solution of the adduct tungsten hexachloride and diethoxy ethane in nobornene nitrile (prepared by diluting the 0.5M catalyst solution of Example 3 with norbornene nitrile) were added to the solution of norbornene dioxocarbonyl in norbornene nitrile at 100°. The resultant precursor polymer exhibited an inherent viscosity of 0.8 dl/g (as measured on a 0.5 g/dl solution in DMF at 25°).

EXAMPLE 5

This example serves to further illustrate the preparation of copolymers by solution polymerization of norbornene dioxocarbonyl and norbornene nitrile.

Norbornene dioxocarbonyl, prepared essentially as indicated in Example 1, and norbornene nitrile (the Diels-Alder adduct of cyclopentadiene and acrylonitrile) were combined in solutions of 1,2-dichloroethane together with diethyl aluminum chloride activator (according to Example 3) and tungsten hexachloride catalyst (according to Example 4) in the proportions indicated in Table 1. I.R. analysis indicated that the resultant polymers contained both nitrile and carbonyl groups.

TABLE 1

| Norbornene Monomers Dioxocarbonyl | (m mol) Nitrile | Solvent (ml) Dichloroethane |
|---|---|---|
| 17.9 | 33.6 | 2 |
| 24.4 | 25.2 | 3 |
| 30.4 | 16.8 | 5 |
| 32.1 | 18.4 | 7 |

EXAMPLE 6

This example serves to illustrate the preparation of precursor polymer by solution polymerization of norbornene diacetate.

3 g of endo norbornene diacetate, prepared essentially as indicated in Example 2, was dissolved in 3 ml of 1,2-dichloroethane to provide a monomer solution. 0.21 ml of 2.05M diethyl aluminum chloride in heptane and 0.15 ml of 0.5M catalyst solution (according to Example 3) were added to the monomer solution to provide a reaction solution which was maintained at room temperature for about 4 hours. Gelation was observed after about 40 minutes. After 4 hours the gel was dispersed by agitation in 15 ml of dichloroethane. Methanol was added to inactivate the catalyst and precipitate the resultant polymer (yield: about 97% based on monomer) which was dried in a vacuum oven.

EXAMPLE 7

This example serves to illustrate the preparation of polymers of cyclopentadienelene vinylene.

A film (about 0.05 mm thick) of poly(cyclopentane diacetate vinylene), prepared essentially as indicated in Example 6, was immersed in a solution of 25% sodium methoxide in methanol under a nitrogen atmosphere to eliminate acetic acid from the polymer. The immersed film was maintained at about 100° for about 4½ hours. (The film turned black in about 2 hours.) The film was then washed in water and dried in a vacuum oven for about 20 hours. I.R. spectroscopic analysis indicated the absence of carbonyl groups which have a characteristic absorption band at about 1730 cm$^{-1}$ and the introduction of conjugated double bonds which have a characteristic absorption band at about 1640 cm$^{-1}$. Polymer films of poly(dioxocarbonyl cyclopentane vinylene) were similarly treated to eliminate carbonic acid units from the polymer. I.R. spectroscopic analysis indicated the removal of carbonyl groups which have a characteristic absorption band at about 1710 cm$^{-1}$ and the introduction of conjugated double bonds which have a characteristic absorption band at about 1640 cm$^{-1}$. The films retained the flexibility of the precursor films yet exhibited resistance to solvents such as chloroform, methylene chloride and dimethylformamide.

As illustrated in the above examples the polymers of this invention are advantageously provided as an outer layer, e.g. to articles comprising precursor polymer. Such articles can be fabricated by thermoplastic processing such as injection molding or more directly by reactive molding (via bulk polymerization). Such precursor polymers can be readily converted to cyclopentadienylene vinylene, a more intractable and solvent resistant polymer. In this regard articles comprising precursor polymer can be readily treated with a reducing agent such as an alkali metal alkoxide to convert the outer layer of polymer to a polymer of this invention comprising cyclopentadienylene vinylene, thus providing the article with a protective polymer layer while retaining desirable bulk properties of the precursor polymer.

While specific embodiments of the invention have been described, it should be apparent to those skilled in the art that various modifications thereof can be made without departing from the true spirit and scope of the invention. Accordingly, it is intended that the following claims cover all such modifications within the full inventive concept.

What is claimed is:
1. Polycyclopentadienylene vinylene.
2. A polymer comprising units of

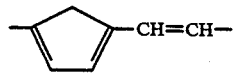

3. A polymer comprising units of

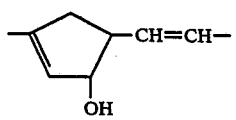

4. An article comprising a polymer having units of cyclopentane dioxo diester vinylene or cyclopentane dioxocarbonyl vinylene, wherein said article has an outer layer comprising polycyclopentadienylene vinylene.

* * * * *